United States Patent [19]

Eskeli

[11] 4,060,989
[45] Dec. 6, 1977

[54] THERMODYNAMIC MACHINE WITH STEP TYPE HEAT EXCHANGERS

[76] Inventor: Michael Eskeli, 7994-41 Locke Lee, Houston, Tex. 77042

[21] Appl. No.: 675,304

[22] Filed: Apr. 9, 1976

Related U.S. Application Data

[63] Continuation-in-part of Ser. No. 600,312, July 30, 1975, Pat. No. 3,986,361.

[51] Int. Cl.² .............................................. F02C 1/04
[52] U.S. Cl. ..................................................... 60/650
[58] Field of Search ................................. 60/650, 682

[56] References Cited
U.S. PATENT DOCUMENTS 2,407,166  9/1946  Kreitner et al. .................. 60/650 X

*Primary Examiner*—Allen M. Ostrager

[57] ABSTRACT

This invention relates to power generation equipment and heat boosters, where a gaseous working fluid is compressed within a rotating rotor, heat is added or removed after such compression, and then the working fluid is expanded against centrifugal force within the rotor, and heat is again either added or removed from the working fluid. Where heat is added after the compression and heat removed after the expansion, the unit will be a power generator; where heat is removed after the compression and heat is added after the expansion, the unit will be a heat booster. Additionally, the unit may be provided with regeneration to exchange heat between the working fluid streams between such heat addition and heat removal. Working fluids that can be used are normally gaseous, and may be for example carbon monoxiode, or a halogenated hydrocarbon, or air.

6 Claims, 8 Drawing Figures

THERMODYNAMIC MACHINE WITH STEP TYPE HEAT EXCHANGERS

This application is a continuation-in-part application of "Turbine with Regeneration", Ser. No. 600,312, filed 7-30-75 now U.S. Pat. No. 3,986,361.

BACKGROUND OF THE INVENTION

This invention relates generally to power generators of the rotary type, where a working fluid is alternately compressed and expanded within a rotating rotor to generate power. Further, this apparatus can be also used to boost the temperature of heat, particularly when such heat is used for power generation.

Previously, rotary turbines and heat boosters have been devised where the heat is added after compression and then heat is removed from the working fluid after expansion. These devices normally have the heat addition and heat removal steps at either constant temperature, or at constant pressure, with the thermal efficiency of the unit determined generally by such operational requirements.

SUMMARY OF THE INVENTION

It is an object of this invention to provide a method and apparatus where the heat addition and heat removal may be carried out in alternate steps of compression and expansion, where heat is added during such steps to improve the overall thermal efficiency of the unit. The steps of compression and expansion, when properly carried out, simulate the well known process of isovolumic heat addition, and thus lead to improved performance. The unit described herein may be used for either power generation, with isovolumic heat addition, and for heat temperature boosting service with isovolumic heat addition.

DESCRIPTION OF PREFERRED EMBODIMENTS

Reference is made to prior U.S. Pat. No. 3,834,179, "Turbine with Heating and Cooling"; 3,926,010, "Rotary Heat Exchanger"; and 3,931,713, "Turbine with Regeneration". It should be noted that the apparatus described in this application is similar, and that the only real difference exists in the manner of heat addition and heat removal from the working fluid.

Figure 1:
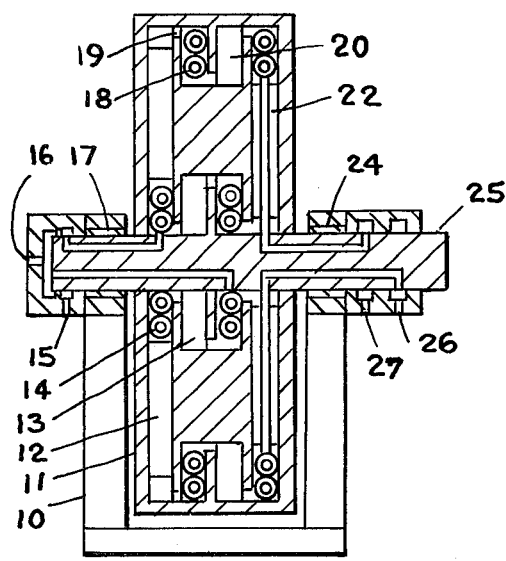
FIG. 1 is a cross section of one form of the apparatus.

Referring to the FIG. 1, therein is shown a unit in cross section, illustrating typical construction for a unit. 10 is base supporting bearings 17 and 24, and shaft 25 and rotor 11. The rotor 11 has vanes 12, 13, 20 and 22 with vanes 12 forming diverging passages and vanes 22 forming converging passages as shown. Hot fluid heat exchanger is 18, and cold fluid heat exchanger is 14. 15 and 16 are fluid entry and exit to cold fluid heat exchanger 14, and 26 and 27 are entry and exit for hot fluid to heat exchanger 18, noting that the heat exchanger at the periphery is usually a single one in one or more parts, and the heat exchanger at center is also a single one in one or more parts. Separate fluid supplies to the separate heat exchanger parts can be supplied through shaft if desired; here, a single supply is provided, to each heat exchanger. 19 is fluid passage which may be a nozzle, arranged to assist in working fluid circulation.

Figure 2:
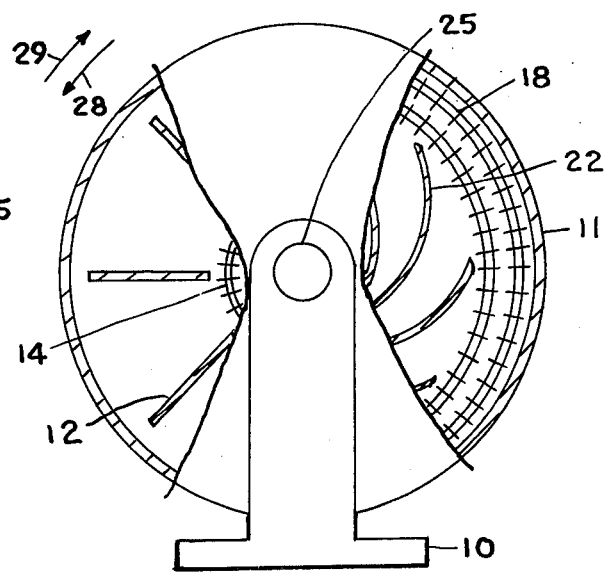
FIG. 2 is an end view of the unit shown in FIG. 1.

In FIG. 2, an end view of the unit of FIG. 1 is shown. 11 is rotor, 18 is hot fluid heat exchanger, 22 is vane, 10 is base, 12 is vane, 25 is shaft, 14 is cold fluid heat exchanger, 29 indicates the usual direction of rotation when the unit is used as a heat booster, and 28 indicates the usual direction of rotation when the unit is used as a power generating heat engine.

Figure 3:
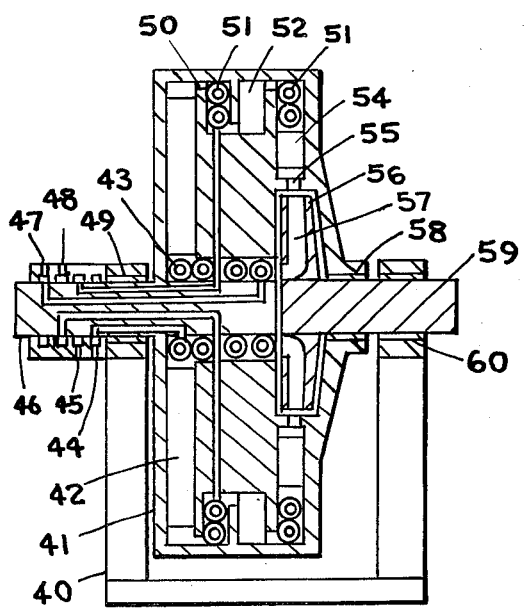
FIG. 3 is a cross section of another form of the apparatus.

In FIG. 3, a unit with two rotors is shown; otherwise the unit is similar to the unit shown in FIG. 1. 40 is base, 41 is first rotor, 42 is vane, 43 is cold fluid heat exchanger, 44 and 47 are cold fluid entry and exit, 46 is first rotor shaft, 45 and 48 are hot fluid entry and exit, 49, 58 and 60 are bearings, 50 is a fluid passage, 51 51 is hot fluid heat exchanger, 54 is vane, 55 are working fluid nozzles, oriented to discharge forwardly for a heat engine and also forwardly for a heat booster, 56 is second rotor, 57 are second rotor vanes, defining working fluid passages.

Figure 4:
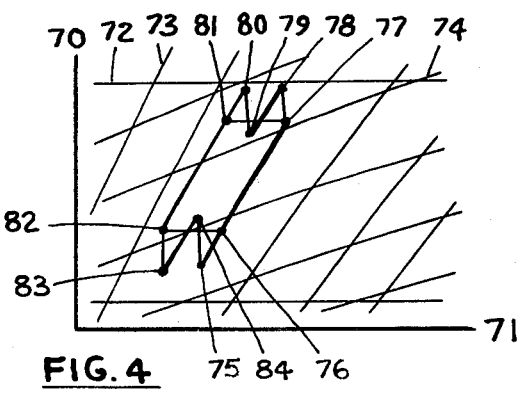
FIG. 4 and FIG. 5 are pressure-enthalpy or pressure-internal energy diagrams for a typical working fluid.

In FIG. 4, a pressure-enthalpy or pressure-internal energy diagram is shown. 70 is pressure line, 71 is enthalpy or internal energy line, 72 is constant pressure line, 73 is constant entropy line, and 74 is constant volume line; the work cycle is shown for a typical unit 75-76-77-78-79-80-81-82-83-84-75. For a typical heat booster, the cycle is as said; and for a typical heat engine, the cycle is reverse. Alternately, the cycle may be for a heat engine 82-81-80-79-78-77-76-82, where a constant pressure heat removal is done, approximately. Similarly, the heat booster may have the cycle 75-76-77-81-82-83-84-75, where the heat removal from the unit is at an approximately constant pressure. Note that in FIG. 3, the unit has the cold heat exchanger along the axis, and this would represent approximately constant pressure heat removal for a heat engine application.

Figure 5:
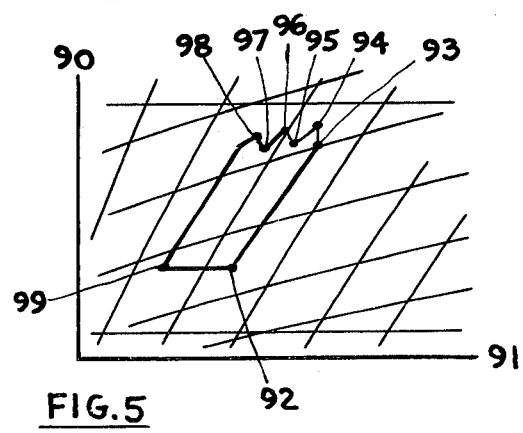

In FIG. 5, another pressure-enthalpy or internal energy diagram is shown. In this diagram, 90 is pressure line, 91 is enthalpy or internal energy line, the cycle is shown by 92-93-94-95-96-97-98-99-92, which illustrates a typical heat engine cycle, with constant pressure heat removal and with several steps at the hot heat exchanger; also, note that heat is being added into the working fluid both along line 93 and 94 and also along line 94-95, this being typical. It should be understood that heat can be added to the working fluid or removed from the working fluid during both expansion and compression as desired, in the hot heat exchanger area and also at the cold heat exchanger area.

Figure 6:
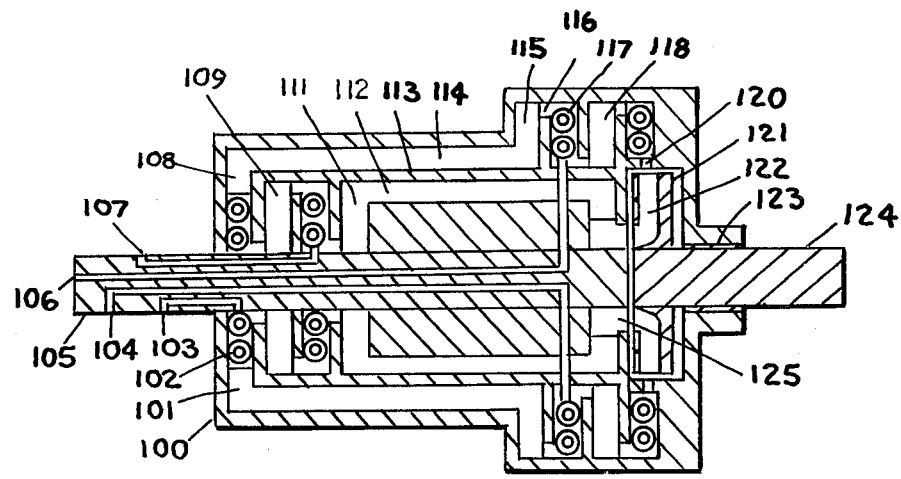
FIG. 6 is a cross section of still another form of the apparatus.

In FIG. 6, the same unit is shown, but a regenerative heat exchanger is being used to reduce the needed rotor rotational speeds, and also in some instances, to improve the overall performance of the machine. 100 is first rotor, 121 is second rotor, 105 is first rotor shaft, 124 is second rotor shaft, 123 is bearing and seal, 102 is cold heat exchanger, 117 is hot heat exchanger, 103 and 107 are entry and exit for cold fluid, 104 and 106 are entry and exit for hot fluid, 108, 111, 115, 118, 122, and 101 are vanes, fins 112 and 114 and heat conducting wall 113 form a regenerative heat exchanger, 116 is working fluid passage, 120 are working fluid nozzles discharging forwardly, and 125 is a working fluid passage.

In operation, the working fluid is circulated within the rotor, and heat either added or removed. In FIG. 1, shaft 25 is caused to rotate, and when the unit is used as a heat engine, the working fluid passes outward in passages 12, heat is added in the hot heat exchanger, and then the working fluid passes inward in passages 22, and heat is removed in the cold heat exchanger 14. The heat addition is shown as being during expansion steps near the periphery, with two steps being used; the number of steps may be as desired, and usually in larger machines, numerous steps are used. Similarly, the heat removal in the cold heat exchanger is in two steps, but more steps may be used. Work is required for the acceleration of the working fluid with the rotor in passage 12 and work is delivered by the working fluid in the backward curved passages formed by vanes 22. The steps at the periphery are usually of the same radial length, as shown; obviously, the radial length of the steps may vary. The operation of the heat pump is similar, except that the fluid flow is reversed, and the heat is delivered at the hot heat exchangers at the periphery and received by the working fluid at the cold heat exchangers at the center.

The operation of the unit of FIG. 3 is similar, except that two rotors are used. When used as a heat engine, power is delivered by shaft 59, and when used as a heat booster, power is delivered into shaft 59. Both rotors rotate in the same direction, but the rotational speed of the second rotor is usually slightly greater than the speed of the first rotor.

The operation of the unit of FIG. 6 is similar to that just described.

The main advantage of the device shown in the drawings of this application is in the heat exchangers for adding or removing heat from the working fluid. These heat exchangers may be in steps, or they may be arranged for constant pressure heat addition and removal. When used in step form as shown, usually at least the heat addition for both the heat engine and heat booster applications is done in steps. The steps are usually of same radial length for both the compression part and the expansion part, of each step, and this means in a centrifuge, that the work exchange between the working fluid and the rotor remains constant as the working fluid passes through the steps. Thus, ideally, there is no work, for example, for the rotor between points 81 and 77 or between points 82-76 of FIG. 4, while at the same time, there is a pressure change. Thus, this type operation is similar in its overall effect to operation where the heat addition occurs at a constant volume process.

The construction of the rotors is conventional. The heat exchangers are shown to be made of finned tubing, but other types heat exchangers can be used, including plate discs stacked to form the rotor, with construction similar to plate type heat exchangers. Further, liquid fluids are shown to be circulated within the heat exchangers; obviously, heat exchangers can be arranged to receive heat from ambient air, for example, or have cooling by ambient air or other gas. Also, gaseous fluids may be circulated within the hot and cold heat exchangers. Further, the units may be constructed in combinations for power applications, for example, the unit of FIG. 1 may be used as a heat pump, and mounted on the same shaft with the first rotor of the unit of FIG. 3, which then would be used as the heat engine; in such applications, the heat exchangers at the rotor periphery and at center can be combined by use of heat pipes, for example. Thus, various arrangements of the apparatus can be made, without departing from the intent of this invention.

Figure 8:
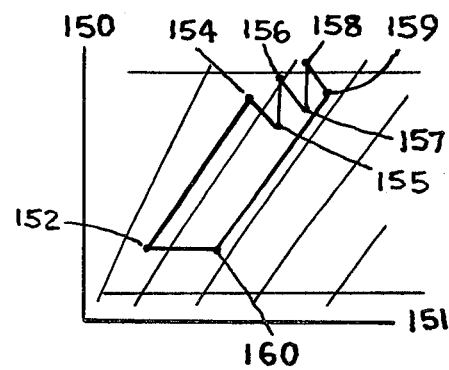
FIG. 8 is another pressure-enthalpy or internal energy diagram.

In FIG. 8, another pressure-enthalpy or internal energy diagram is shown, with the work cycle illustrated thereon. The work cycle for a heat engine is 152-154-155-156-157-158-159-160-152, and the pressure line is 150 and the enthalpy or internal energy line is 151. The heat booster cycle is reverse to that for a heat engine. In this cycle, line 155-156 is provided with cooling, with this cooling obtained from the previous line 154-155, which is heated. To heat the working fluid as shown by line 154-155, heat is added from external sources, in addition to the heat from the working fluid of line 155-156 where the working fluid is being compressed. The heat transfer between the working fluid streams of lines 154-155 and 155-156 in regenerative fashion, similar to the regenerator heat exchange of 112-113-114 of FIG. 6. The use of cooling in lines 154-155, 157-158, increases the pressure of the working fluid due to density changes without additional work being added to it from the rotor, and thus improves the rotor overall performance. Similar constructions can be also made at the cold heat exchanger located nearer to the rotor center than the hot heat heat exchanger.

Figure 7:
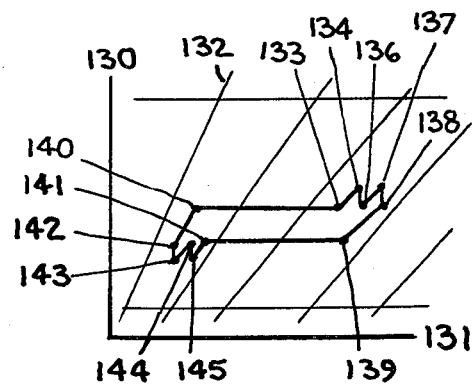
FIG. 7 is a pressure-enthalpy or internal energy diagram for a typical working fluid with the work cycle thereon shown for a unit of the type of FIG. 6.

It should be also noted that the rotors described herein may be of the open type with the working fluid entering near the rotor center, and being supplied from sources external to the rotor. Such arrangements have been shown in the previous patents listed in this application hereinbefore. In FIG. 7, a pressure-internal energy diagram for a working fluid is shown, with work cycle for a thermodynamic machine superimposed thereon. This work cycle is specifically for a unit of the type shown in FIG. 6. 130 is pressure line, 131 is internal energy line, 132 is entropy line, and the work cycle for a heat engine is typically 142-140-133-134-136-137-138-139-141-142 and for a heat booster 142-143-144-145-141-139-138-137-134-133-140-142. Regenerative heat exchange occurs between lines 139-141 and 133-140, for both heat booster and for heat engine, and the heat addition for both work cycles is step type. Heat removal for the heat engine may be at constant pressure as indicated, or be isothermal, in which case line 142-143-144 would be used. For the heat booster, the heat removal may be as indicated, or be at constant pressure.

What I claim is:

1. In a thermodynamic machine, wherein a working fluid is compressed and expanded in a cycle, with the compression being provided within an outwardly extending rotor passage, (and) the expansion is provided within an inwardly extending rotor passage, the outward ends of said passages being connected by a first passage means and the inward ends of said passages being connected by a second passage means to form a continuous fluid circulation loop, (and wherein a hot heat exchanger is provided to exchange heat with the working fluid downstream of the compression within said outward extending rotor passages,), said fluid circulation loop being provided with a heat addition heat exchanger and a heat removal heat exchanger, the improvement comprising:

a. providing said (a step type hot) heat addition heat exchanger (to exchange heat with said working fluid downstream of said compression) with heat addition steps comprising outwardly and inwardly extending passages and heat exchange means to add heat into said working fluid simultaneously with work exchange by said fluid with the rotor.

2. The method of claim 1 wherein more than one heat addition step is provided and wherein the temperature of such heat addition progressively changes from step-to-step.

3. The thermodynamic machine of claim 1 wherein said heat addition steps comprise multiple steps of compression and expansion and wherein at least one expansion step is provided with a heat exchanger to add heat into the working fluid during such step.

4. The thermodynamic machine of claim 3 wherein at least one compression step is provided with a heat addition heat exchanger.

5. In a thermodynamic method of pumping heat and generating power, wherein a working fluid is compressed and expanded in a cycle, and heat is added into said working fluid and is rejected by said working fluid and wherein the work cycle is at least in part non-flow type, the improvement comprising:
   a. addition of heat into said working fluid in alternate steps of compression and expansion with the heat addition occurring during at least one of such steps. (compression and expansion steps)

6. The thermodynamic method of claim 5 wherein heat is rejected from said working fluid in alternate compression and expansion steps.

* * * * *